Sept. 26, 1961　　　R. E. CARLBERG ET AL　　　3,001,454
RAMMER DEVICE FOR MISSILE LOADING SYSTEMS
Original Filed Oct. 7, 1953　　　　　　　　9 Sheets-Sheet 2

INVENTORS
Robert E. Carlberg
Sidney Hersh
BY
ATTORNEYS

Sept. 26, 1961 R. E. CARLBERG ET AL 3,001,454
RAMMER DEVICE FOR MISSILE LOADING SYSTEMS
Original Filed Oct. 7, 1953 9 Sheets-Sheet 4

INVENTORS
Robert E. Carlberg
Sidney Hersh

BY

ATTORNEYS

Sept. 26, 1961 R. E. CARLBERG ET AL 3,001,454
RAMMER DEVICE FOR MISSILE LOADING SYSTEMS
Original Filed Oct. 7, 1953 9 Sheets-Sheet 8
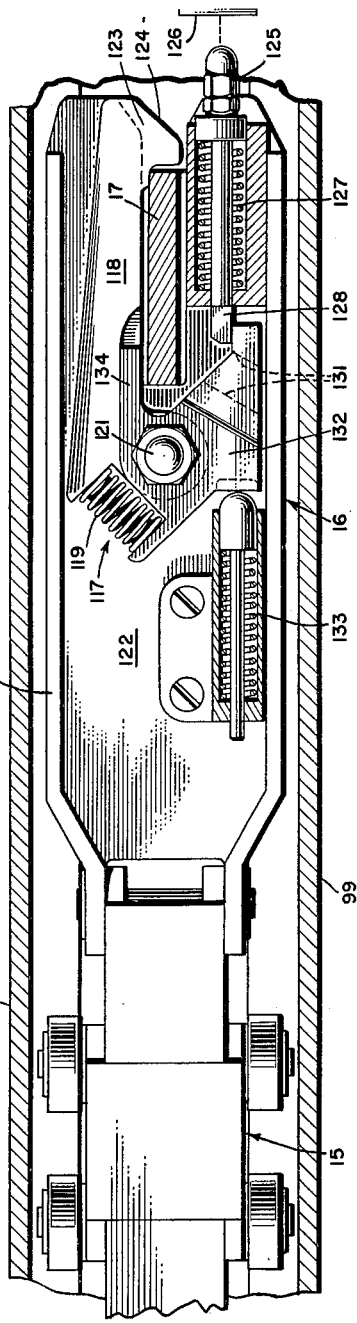
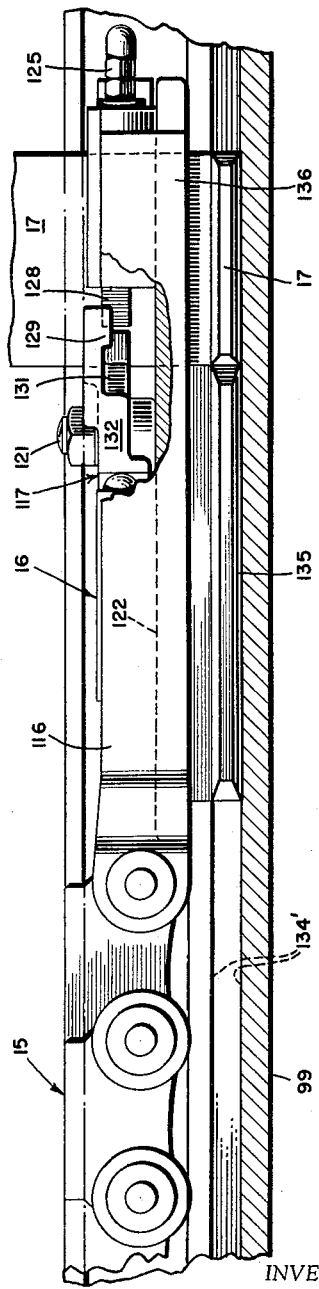
INVENTORS
Robert E. Carlberg
Sidney Hersh
BY
ATTORNEYS

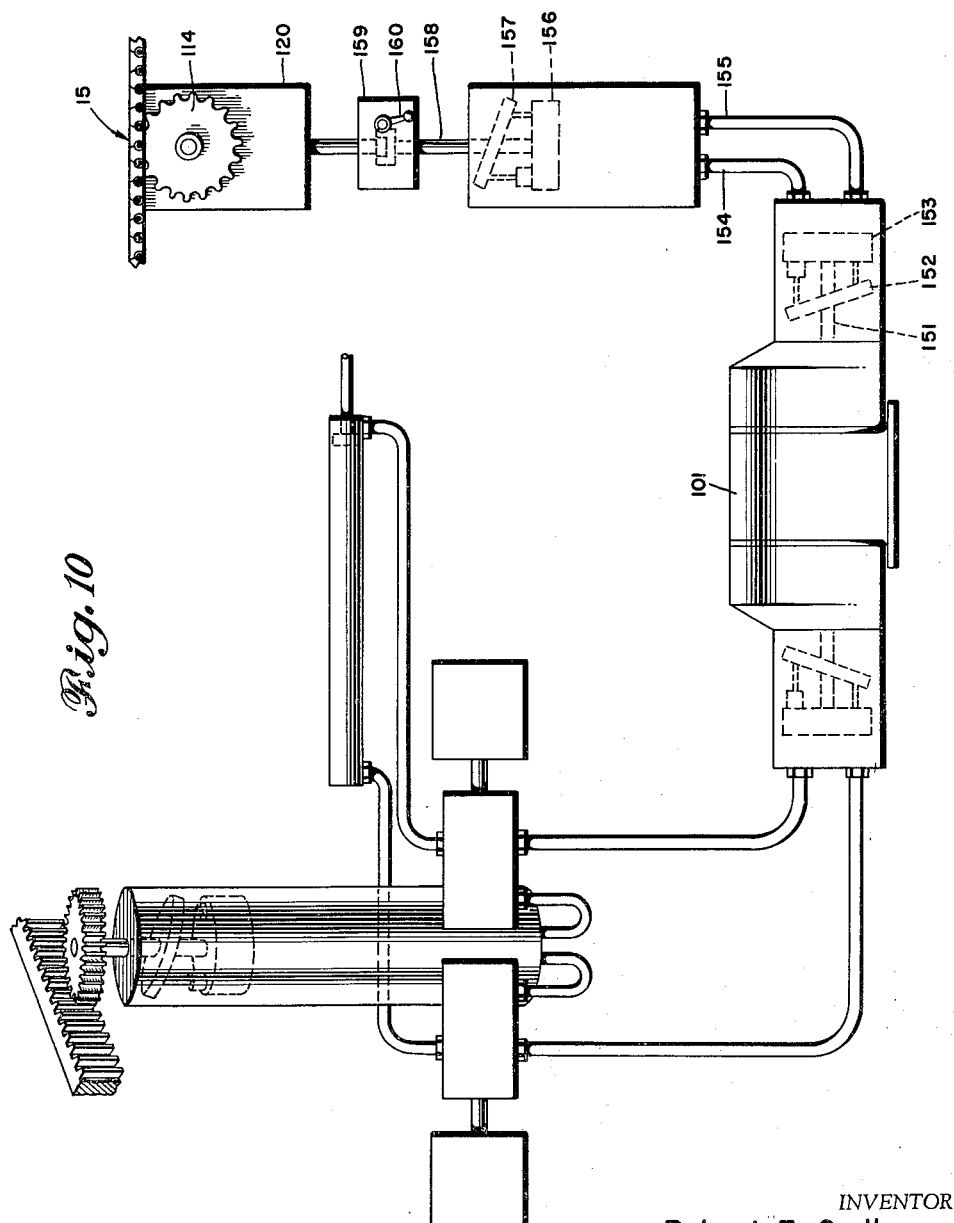

United States Patent Office 3,001,454
Patented Sept. 26, 1961

3,001,454
RAMMER DEVICE FOR MISSILE LOADING SYSTEMS
Robert E. Carlberg, Falls Church, Va., and Sidney Hersh, Silver Spring, Md., assignors to the United States of America as represented by the Secretary of the Navy
Original application Oct. 7, 1953, Ser. No. 384,801, now Patent No. 2,985,072, dated May 23, 1961. Divided and this application Nov. 2, 1954, Ser. No. 466,462
6 Claims. (Cl. 89—47)
(Granted under Title 35, U.S. Code (1952), sec. 266)

The invention described herein may be manufactured and used by or for the Government of the United States of America for governmental purposes without the payment of any royalties theron or therefor.

This application is a division of the copending application of Robert E. Carlberg and Sidney Hersh for Missile Launching System, Serial No. 384,801, filed on October 7, 1953, now Patent No. 2,985,072.

The present invention relates to missile launching systems and more particularly to that type which is adapted for and designed to be used on shipboard and provided with a three-axis stabilized launcher. However, it is to be understood that the invention may be practiced other than on shipboard such as at stationary launcher sites. The present invention is particularly suitable for the launching of guided missiles, rocket and similar self-powered devices.

Heretofore, none of the missile launching systems have been entirely satisfactory for shipboard launching of a pulse jet, wing type guided missile. One of the reasons why the prior launching systems have not been entirely satisfactory for shipboard launching of the afore-mentioned type missile is that none of them have employed a launcher constructed for three axis stabilization.

With the foregoing in mind it is an object of this invention to provide a rammer device for a missile launching system particularly adapted for shipboard use in launching a guided missile of the foldable wing type and which may be powered by a pulse jet motor, if so desired.

Another object of the present invention resides in the provision of a rammer device for a missile launching system which may be conveniently operated by shipboard personnel within a protective structure while the ship is under fire.

A further object is the provision of a missile ramming device which will ram the missiles from a convenient height for operating personnel, prior to ramming, to make preflight inspections, adjustments and repairs.

A still further object resides in the provision of a missile ramming device which is enclosed within the structure of the ship and so positioned as to require no lifting of the missile during the loading operation.

Yet another object resides in the provision of a new and novel ramming mechanism for accomplishing a transfer of a missile from the loader to the loaded position on the launcher when the loader and launcher are positioned in longitudinal engaging alignment with one another.

Other objects and many of the attendant advantages of this invention will be readily appreciated as the same becomes better understood by reference to the following detailed description when considered in connection with the accompanying drawings wherein:

FIG. 1 is a side perspective view of a missile launching system embodying a rammer mechanism in accordance with the present invention;

FIG. 2 is a side elevation view of the rammer device of the present invention and an associated missile launching system indicating the manner in which the several portions may be mounted upon the deck of a vessel with the assembly stand and loading mechanism of the system enclosed in a housing, the missiles being disclosed by broken lines in supported position upon the assembly stand and loading mechanism and by broken lines in a supported launching position upon the launcher mechanism;

FIG. 8 is an enlarged top plan view of the rammer head assembly with portions shown in horizontal section;

FIG. 9 is an enlarged side elevation of the rammer head assembly; and

FIG. 10 is a schematic showing of the shuttle car and rammer chain actuating mechanisms.

Figure 1:
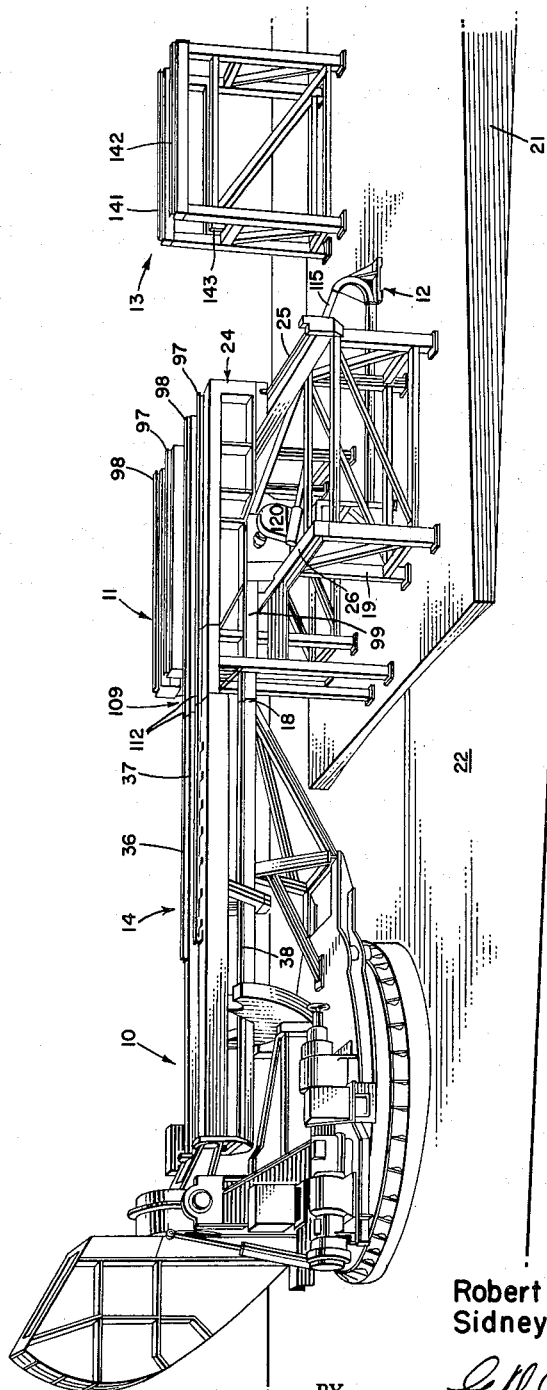
Figure 2:
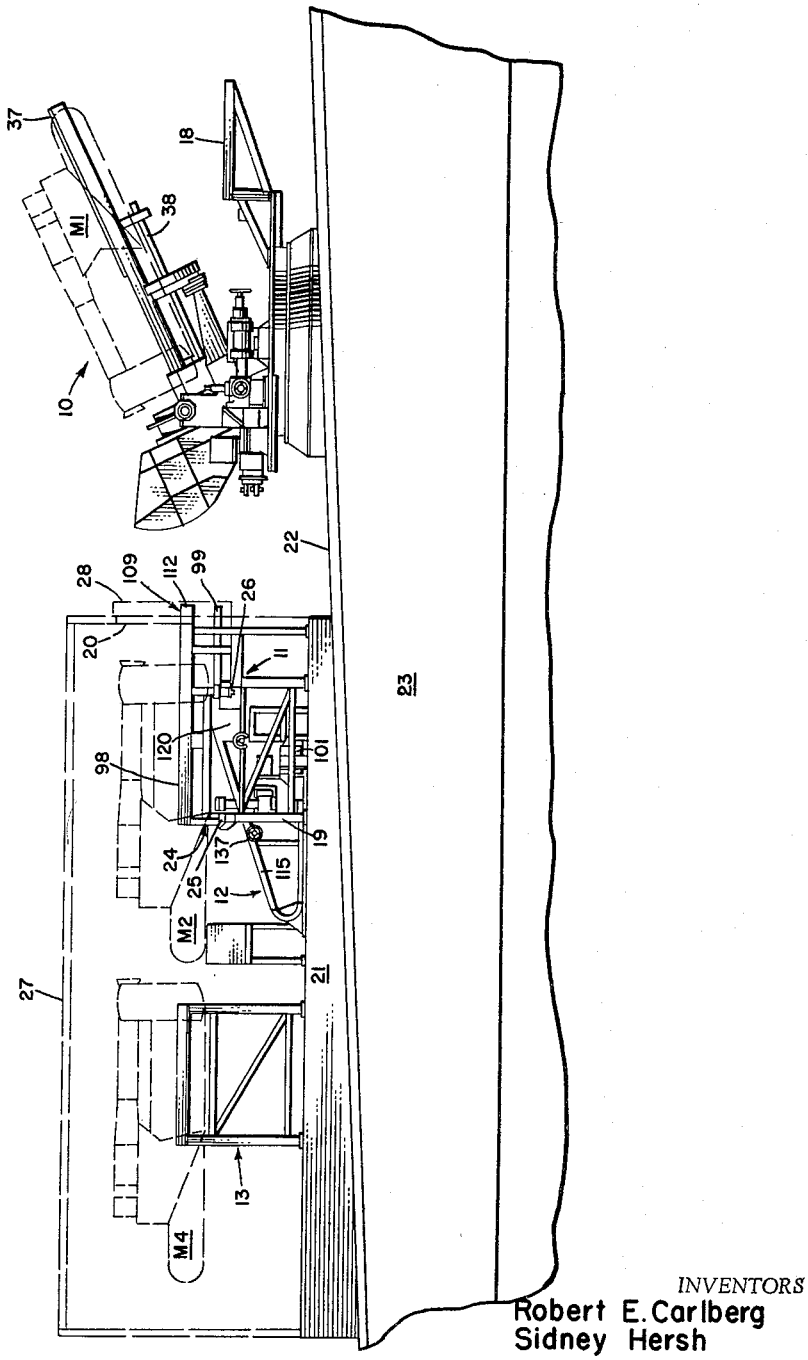
Figure 3:
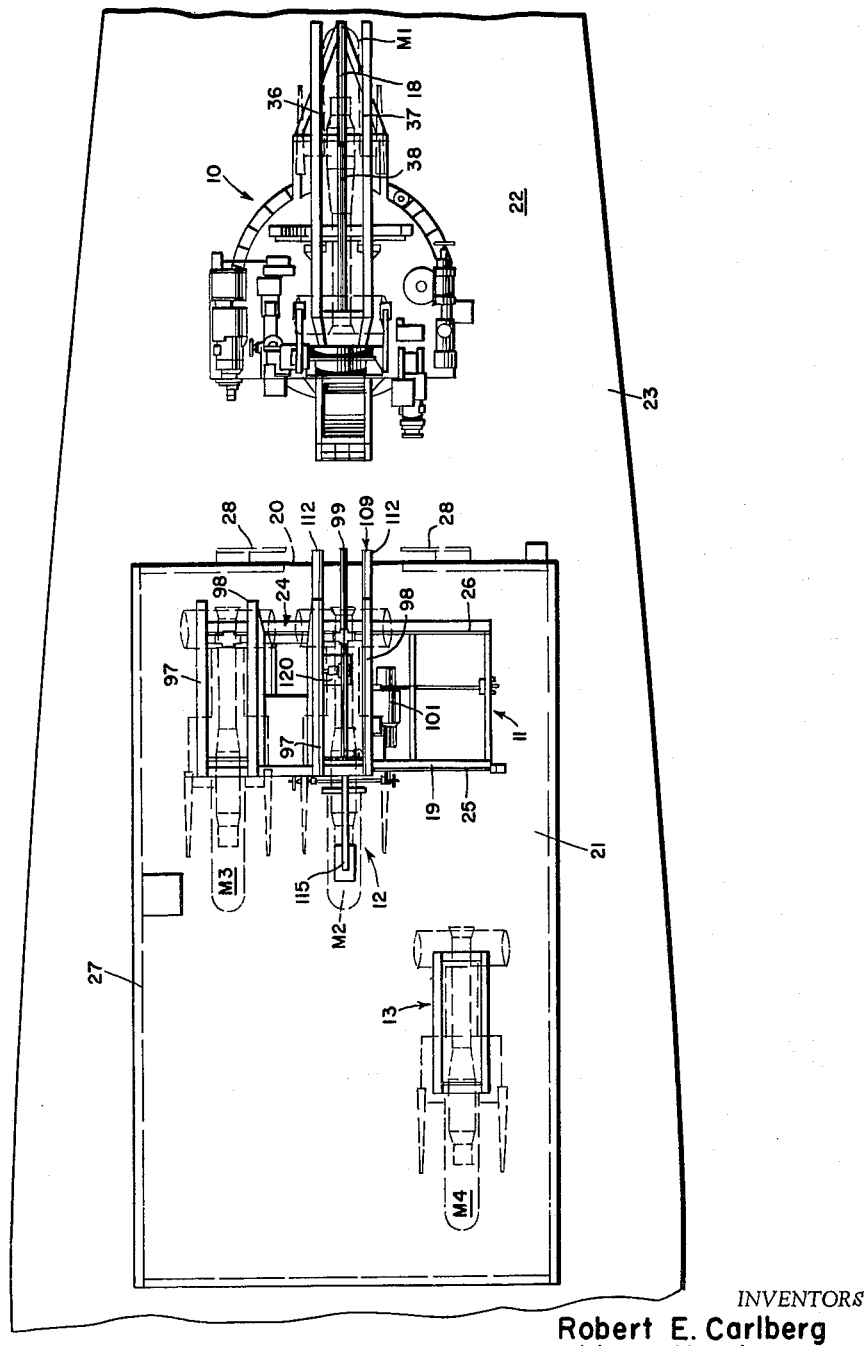
FIG. 3 is a top plan view of a missile launching system including the rammer of the present invention and mounted upon the deck of a vessel.
Figure 4:
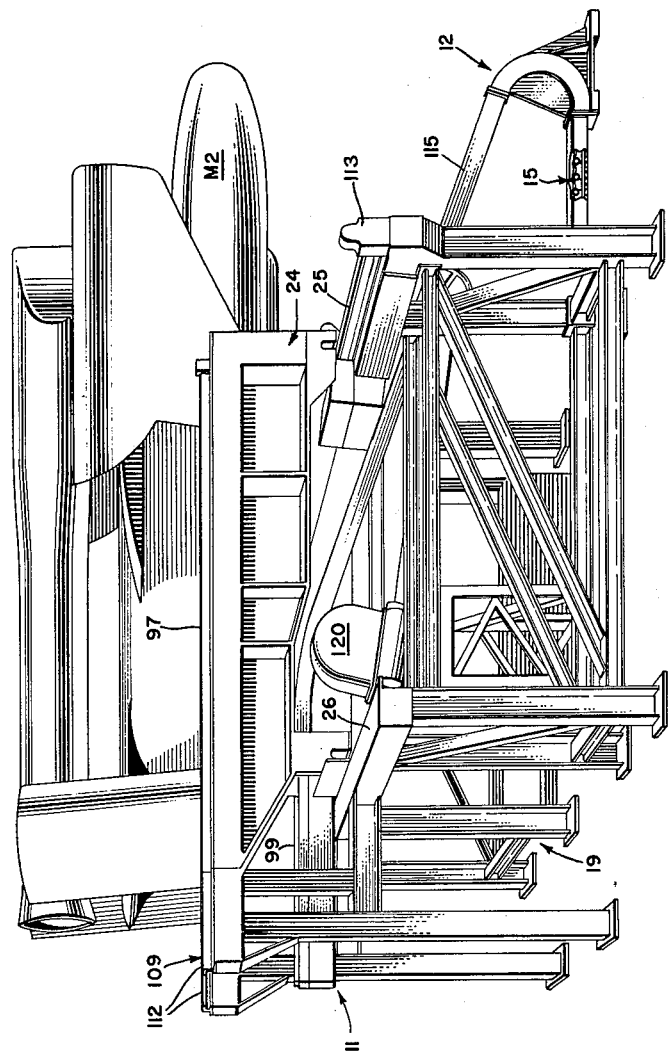
FIG. 4 is a side perspective view of a loading mechanism and the ramming mechanism of the instant invention operatively connected with the loading mechanim and with a missile secured thereto for ramming.
Figure 5:
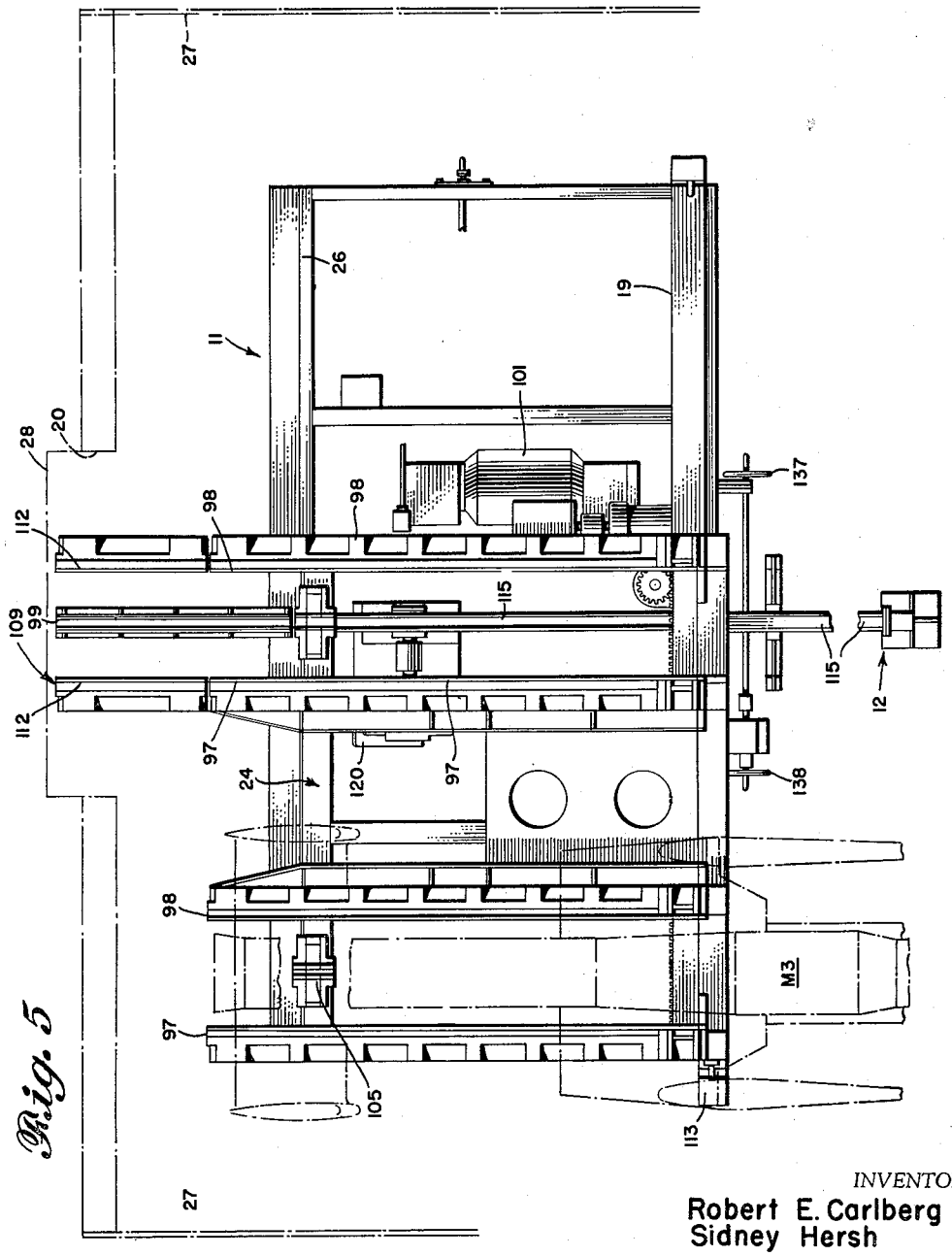
FIG. 5 is a top plan view of the loader and a portion of the rammer, one missile being illustrated in phantom in the ready-service position on the loader.
Figure 6:
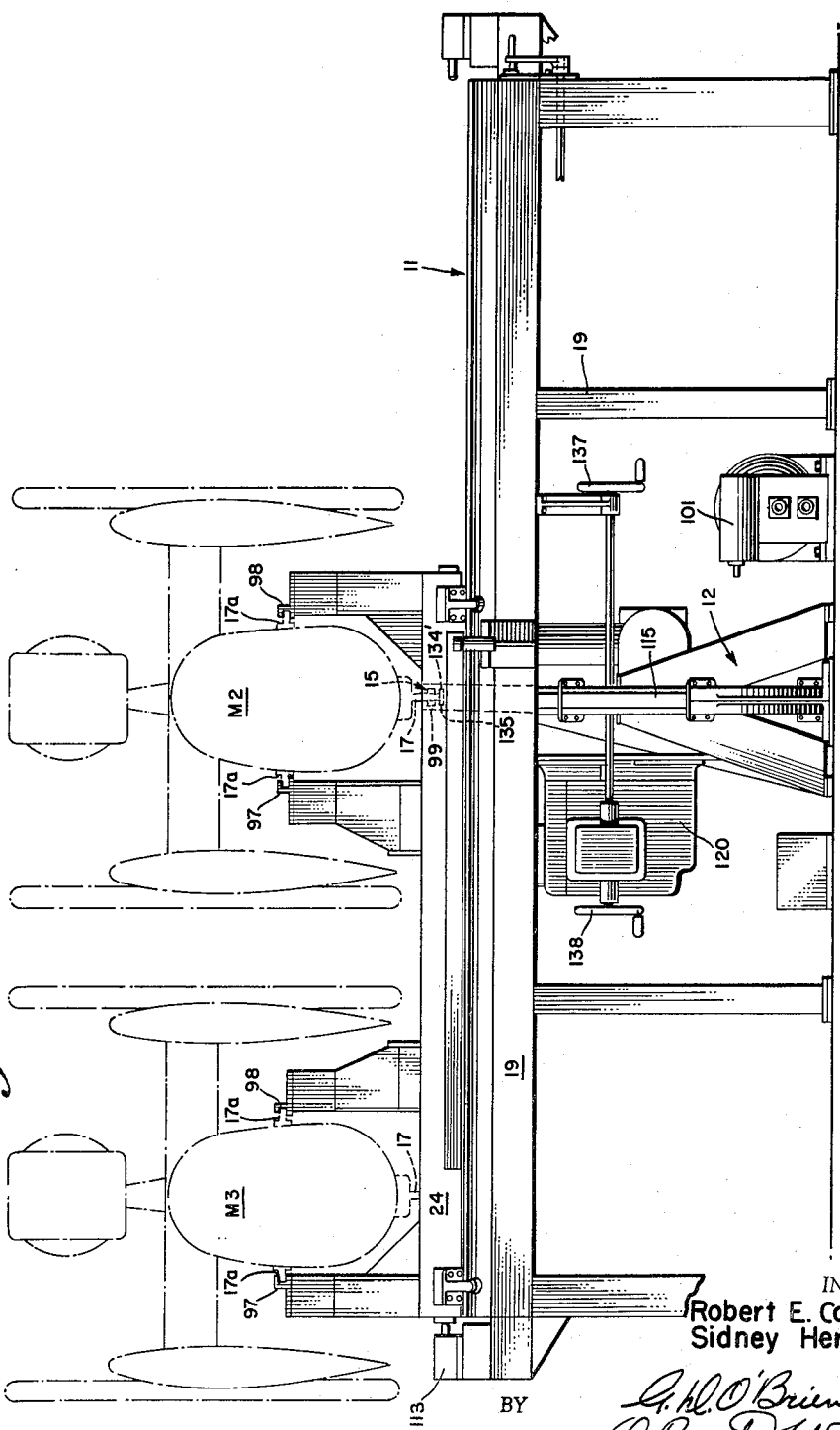
FIG. 6 is a rear elevation view of the loading mechanism of FIG. 4 and the ramming mechanism of the present invention.

Referring now to the several figures of the drawings and more particularly to FIGS. 1, 2 and 3 wherein various components and mechanisms of a suitable missile launching system are illustrated in a manner to indicate the cooperating relationship between the rammer device of the present invention and the remainder of the system, it will be observed that the system includes a three-axis stabilized launcher 10, a loading mechanism 11, the novel ramming mechanism 12 of this invention, and an assembly stand 13, each of which will now be described generally in order to facilitate a clear understanding of the detailed description of the ramming mechanism appearing hereinafter. It will be understood that the specific details of the launching system are disclosed by way of example only and that other launchers and loading mechanisms may exist or be invented which would be suitable for use with the present invention.

Figure 7:
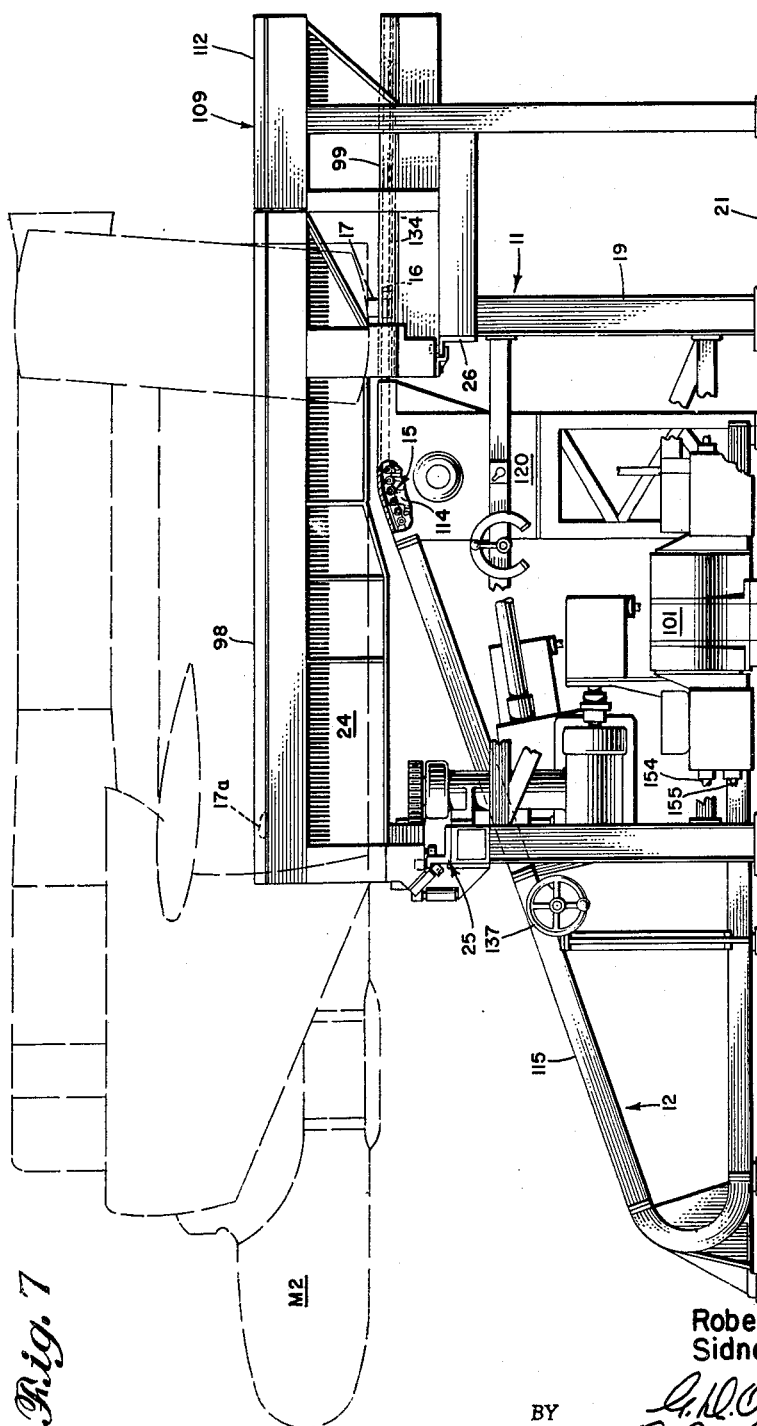
FIG. 7 is a side elevation of the loading mechanism of FIG. 4 and the ramming mechanism of the instant invention with the shuttle car buffer stop removed and certain portions of the supporting structure broken away to better disclose the mechanism of the rammer.

The launcher 10 is a power driven remotely controlled mount having the launching rails 14 stabilized so as to maintain a fixed attitude with respect to the horizon in elevation and cross traverse as will become more fully apparent as the description proceeds. The launcher 10 is "muzzle loaded" by the novel power driven, manually controlled, horizontal ramming mechanism 12 of the present invention. The novel ramming mechanism 12 includes a rammer chain 15 with a ramming head assembly 16 connected thereto in any suitable manner, such for example, as by a pin or the like as more clearly shown on FIGS. 7 and 8. The ramming head assembly 16 engages the lower rear launching shoe 17 of each missile to be transferred from the loader to the launcher or vice versa, the aforesaid missile being provided with an additional pair of upper front shoes 17, the purpose of which will be more readily apparent as the description proceeds. By reason of the chain construction the links thereof are movable pivotally in but one direction and also provide a rigid structure for moving the rammer mechanism 12 in either ramming or the retracting operation. A spanner rail 18 for spanning the distance between the loading mechanism 11 and the launcher 10 is secured to the trainable portion of the launcher.

The loading mechanism 11 includes a rigid structure 19, fixedly secured to a suitable foundation 21 provided upon deck 22 of a ship 23. The loading mechanism 11 further includes a shuttle car 24 which is power driven by apparatus to be later described and which is adapted to carry a plurality of missiles M2 and M3, two being shown in the drawings for purposes of description. One of the two missiles which are carried by shuttle car 24 will always be aligned with the launcher loading position, as best illustrated in FIG. 3. The shuttle car 24 is mounted upon suitable transverse guide rails 25 and 26 so as to permit oscillation of shuttle car 24 athwartship.

The assembly stand 13 is rigidly secured to foundation 21, to provide a structure upon which the missile components may be assembled after being removed from the shipping crates. After assembly of the missile on assembly stand 13, the missile is checked out for satisfactory operation and moved by any suitable means such, for example, as by overhead trolley (not shown) onto shuttle car 24 on the loading mechanism.

All components and mechanisms of the missile launching system with the exception of the launcher are enclosed within a suitable housing 27 having sliding doors 28 which, when open, provide an opening 20 or travel space for a missile at the launching position to be rammed from the loading mechanism 11 onto the spanner rail 18 and the launcher 10 at the appropriate time. Sliding doors 28 are normally closed except during ramming of a missile from the loading mechanism to the launcher.

It will be apparent that in the event the missile launching system is mounted on the forward portion of a ship, the loading mechanism, the ramming mechanism, and the assembly stand will all be secured to the deck of the vessel aft of the launcher. On the other hand, in the event the system is mounted on the aft portion of the vessel, the afore-mentioned components other than the launcher will be secured to the deck of the vessel forward of the launcher. Obviously any other suitable arrangement of the various components of the system may be employed if so desired.

The ramming mechanism of the present invention will now be described in detail.

The rammer 12 includes a power driven rammer chain 15 having a rammer head assembly 16 provided thereon, as afore-mentioned. Rammer chain 15 is guided through housing 115 and over sprocket 114 which is mechanically connected to a suitable gear reduction unit 120, the latter being hydraulically connected to power drive 101 in any suitable manner such, for example, as that shown in FIG. 10.

Shaft 151 of electric motor 101 is connected to wobble plate 152 to rotate the latter in response to operation of the motor. A pumping action is thus produced within pump 153 which is connected to a source of hydraulic fluid. Hydraulic lines 154 and 155 connect pump 153 to the hydraulic side 156 of wobble plate 157 thereby to rotate shaft 158. Clutch 159 may be controlled in any suitable fashion, a manual control lever 160 being shown, and connects shaft 158 with gear reduction unit 120 to thereby actuate rammer chain 15 by way of sprocket wheel 114. Any suitable interlock, not shown, may be employed for preventing simultaneous operation of the rammer and shuttle car. The position of the rammer is manually controlled by either handwheel 137 or 138, as desired, each of which regulates hydraulic power drive 101 and, consequently, gear reduction unit 120. The rammer head 16 engages the lowermost shoe 17 on the missile and pushes the missile along and off of the shuttle car rails 97 and 98, rails 112 and 99 on track section 109, and onto the registering spanner rail 18 and the launcher rails 36, 37, and 38. Prior to ramming, all movable structures which determine the ramming path are locked together by suitable hydraulic latches, not shown, so that they will not shift relative to one another. It will be understood that rails 97 and 98 on the shuttle car and rails 36 and 37 on the launcher engage the uppermost shoes 17 carried by the missile and rail 99 carried by the shuttle frame and rails 18 and 38 carried by the launcher engage the lowermost shoe 17 on the missile.

The rammer head assembly 16, FIGS. 8 and 9, includes laterally spaced walls 116 within which the missile gripping and releasing mechanism 117 is partially enclosed. A deceleration and missile retraction latch 118 which is spring loaded by spring 119 is pivotally connected upon stud 121 which is secured in an erect position on the floor 122 of rammer head assembly 16. The deceleration and missile retraction latch 118 is provided with a hooked portion 123 for engagement behind the lower missile launching shoe 17 of a missile, the leading surface of hook portion 123 being inclined so as to provide a cam surface 124 adapted to be engaged by the lower shoe 17 after the shoe has been inserted in lower rail 99 on the shuttle car frame and moves the latch 118 an amount sufficiently to permit the hooked portion 123 thereon to engage and lock the lower shoe 17 to the head as more clearly shown on FIG. 8. It will be understood that the rammer head is normally disposed in longitudinal alignment with lower rail 99, the head being adapted to travel along rail 99 on the shuttle car frame and lower rails 18 and 38 on the launcher during a missile ramming and releasing operation.

When shoe 17 is encountered by hook portion 123 in response to a forward motion of rammer chain 15, cam surface 124 will ride over the surface of shoe 17 to thereby laterally displace latch 118 against the action of spring 119. When the hook portion 123 has cleared shoe 17, spring 119 forces latch 118 into the position shown in FIG. 8, whereby the missile is secured to the rammer head assembly 16 for either loading onto the launcher or retraction therefrom, as the case may be.

The lower launching shoe 17 is released from the rammer head assembly when trigger 125 strikes stop 126 on the launcher during the loading operation whereupon the trigger is moved against the action of spring 127 in such a manner that the offset lug 128 thereon rides under projection 129 and into space or recess 131 of sear 132 which is resiliently loaded by spring 133. The sear 132 then swings on pivot 121 in response to the release of its spring load so that finger 134 thereon presses outwardly against the latch 118 thereby moving hook portion 123 to the unlatched position. Rammer head assembly 16 can then be returned to its initial position where it may be reset by hand.

It will be readily apparent that during a retraction operation as when it is desired to remove a missile from the launcher rather than to launch the missile, shoe 17 is secured to the rammer head assembly in the manner aforedescribed. The rammer head assembly together with the missile to which it is connected is next retracted to the loading mechanism 11. Trigger 125 is then manually actuated to release the lower shoe 17 whereupon the missile may be lifted from the loading mechanism by the overhead trolley crane, mentioned hereinbefore.

It will be understood that the lower rail section 99 on the frame of the loading mechanism 11, is provided with a lower guideway 134 which is of a shape substantially corresponding to an inverted T and which cooperates with similar guideways in rails 18 and 38 when the loader and launcher are in a loading position, FIG. 1. This T-shaped guideway accommodates a guide 135 which is mounted on the undersurface 136 of floor 122 of the rammer head assembly and in engagement with lower shoe 17 when the shoe is locked to the rammer head. Guide 135 and lower shoe 17 are of a shape complementary to guideway 134 and are adapted to be inserted into the guideway from the end thereof, it being understood that rails 18 and 38 on the launcher align with rail 99 on the shuttle car frame when the loader and launcher are in a loading position.

The movement of rammer chain may be controlled by either handwheel 137 or 138, as previously mentioned.

The rammer mechanism 12 operates to move rammer head 16 slowly forward until the rear missile launching shoe 17 is connected to rammer head 16. The sliding doors 28 are next opened and the launcher 10 is positioned in train, elevation, and cross traverse to the loading position and locked as is best indicated in FIG. 1.

The missile is now rammed to the loaded position on launcher 10 whereupon the rammer head 16 automatically releases the missile lower launching shoe 17 at the end of the rammer stroke and rammer chain 15 is retracted.

Briefly summarizing it will be apparent that the launcher is loaded from the "muzzle" thereof by the use of a power driven, manually controlled horizontal rammer of the unidirectional chain type. The rammer is provided with a ramming head assembly which is so constructed as to enable the rammer to either move a missile forward under positive control or to retract a missile from the launcher as desired.

Obviously many modifications and variations of the present invention are possible in the light of the above teachings. It is therefore to be understood that within the scope of the appended claims the invention may be practiced otherwise than as specifically described.

What is claimed is:

1. A ramming mechanism for ramming a missile onto a missile launcher including a ramming chain, a power driven sprocket wheel drivingly connected to said chain, a rammer head connected to one end of said chain, means including a normally locked member pivotally mounted on said rammer head for positively coupling said head to the missile to be loaded onto the launcher, a spring biased element having a lug in locking engagement with said member for maintaining the member in a locked condition until said spring biased element is moved a predetermined amount, a recess formed in said member in the path of travel of said lug and cooperating with said lug for releasing the member as the lug is moved into alignment with said recess in response to movement of the spring biased element said predetermined amount, and means in engagement with said member for moving the member an amount sufficiently to uncouple said head and chain from a missile as the member is released, said ramming chain being mounted in longitudinal alignment with the longitudinal axis of the launcher when the latter is in loading position.

2. A ramming mechanism for ramming a missile onto a missile launcher including a ramming chain mounted in longitudinal alignment with the longitudinal axis of the launcher, a power driven sprocket wheel drivingly connected to said chain, a rammer head connected to one end of said chain, a latch member pivotally carried by said rammer head in engagement with said missile for locking the head to said missile, a normally locked sear pivotally secured to said rammer head in engagement with said latch member for maintaining said latch member in engagement with said missile until said sear is released, spring loading means in engagement with said sear for urging said sear and latch member to a release position thereby to release said head from a missile, a latch trigger in slidable engagement with said sear and movable from a first position to a second position for maintaining the sear and latch in a locked condition against the action of said spring loading means until said latch trigger has been moved to said second position, cooperating means on said sear and trigger for releasing said sear as said latch trigger is moved to said second position.

3. A mechanism for ramming a missile onto a missile launcher including a ramming and retraction chain, a power driven sprocket wheel drivingly connected to said chain, a rammer head secured to one end of said chain, latch means pivotally contained in and carried by said head for releasably locking the head to a missile and for releasing the head from the missile as the latch means is actuated to a release position, a normally locked member contained in and pivotally mounted on said head in engagement with said latch means, spring means in engagement with said normally locked member for actuating the member to an unlocked position as the member is released, movable means in engagement with said member for maintaining the member locked against the action of said spring means until said movable means is moved a predetermined amount, means on said member cooperating with complementary means on said movable means for releasing the member as the movable means is moved said predetermined amount, and means on said member in engagement with said latch means for moving the latch means to said release position as said member is actuated to said unlocked position by the spring means.

4. A claim according to claim 3 and including a spring in engagement with said latch means and the normally locked member for urging said latch means and the member from the released position to an initial position.

5. A mechanism for ramming a missile onto a missile launcher including a ramming and retraction chain, a power driven sprocket wheel drivingly connected to said chain, a rammer head secured to one end of the chain, latch means contained in and pivotally mounted on said head for releasably locking the head to a missile and for releasing the head from the missile as the latch means is actuated to a release position, a normally locked member contained in and pivotally mounted on said head in engagement with said latch means, spring means in engagement with said normally locked member for actuating the member to an unlocked position as the member is released, a spring biased trigger contained in and carried by the head, a lug on one end of said trigger in engagement with the member for maintaining the member locked against the action of said spring means until said trigger is moved a predetermined amount, a recess in said member cooperating with said lug as the trigger is moved said predetermined amount for releasing the member, and a finger on said member in engagement with the latch means for moving the latch means to said release position as the member is actuated to the unlocked position by said spring means.

6. A ramming mechanism for ramming a missile onto a missile launcher including a movable chain, a power driven sprocket wheel drivingly connected to said chain, a rammer head secured to one end of said chain, means including a normally locked member pivotally mounted on said rammer head for positively coupling said chain to the missile to be loaded for moving the latter onto the launcher, a spring biased trigger having a lug on one end thereof in engagement with said member for maintaining the member in a normally locked condition until said trigger is moved a predetermined amount, a recess on said member cooperating with said lug for releasing the member when said spring biased trigger is moved said predetermined amount, and means in engagement with said member for actuating the member to an unlocked position as the member is released whereby the chain is uncoupled from said head.

References Cited in the file of this patent

UNITED STATES PATENTS 2,425,425    Jorgensen _____ Aug. 12, 1947